United States Patent
Jerphagnon et al.

(10) Patent No.: US 9,983,041 B1
(45) Date of Patent: May 29, 2018

(54) AUTOMATED DISTRIBUTION UNIFORMITY MEASUREMENTS AND FARMING PRESCRIPTIONS USING AERIAL IMAGERY AND PUMP ENERGY DATA

(71) Applicant: PowWow Energy, Inc., Sunnyvale, CA (US)

(72) Inventors: Olivier Jerphagnon, Redwood City, CA (US); Jim Klingshirn, Santa Barbara, CA (US)

(73) Assignee: POWWOW ENERGY, INC., Sunnyvale, CA (US)

( * ) Notice: Subject to any disclaimer, the term of this patent is extended or adjusted under 35 U.S.C. 154(b) by 592 days.

(21) Appl. No.: 14/592,867

(22) Filed: Jan. 8, 2015

(51) Int. Cl.
*G01F 22/00* (2006.01)
*A01G 25/16* (2006.01)

(52) U.S. Cl.
CPC ............ *G01F 22/00* (2013.01); *A01G 25/16* (2013.01)

(58) Field of Classification Search
CPC ......... G01F 22/00; A01G 25/16; A01G 25/09; A01G 25/023
USPC ................ 702/50; 307/23; 700/284; 703/11; 239/267, 732
See application file for complete search history.

(56) References Cited

U.S. PATENT DOCUMENTS

| | | | |
|---|---|---|---|
| 4,491,274 A * | 1/1985 | Noble | A01G 25/09 239/734 |
| 5,422,822 A | 6/1995 | Toyota et al. | |
| 6,830,203 B2 * | 12/2004 | Neyestani | A01G 25/023 239/267 |
| 8,097,981 B2 | 1/2012 | Shimada et al. | |
| 2009/0133733 A1 | 5/2009 | Retti | |
| 2011/0025125 A1 | 2/2011 | Brabec | |
| 2011/0025267 A1 | 2/2011 | Kamen | |
| 2012/0091731 A1 | 4/2012 | Nelson | |
| 2013/0334880 A1 | 12/2013 | Jarphagnon | |
| 2015/0199846 A1 * | 7/2015 | Sanderson | G06T 11/206 703/11 |
| 2016/0202679 A1 * | 7/2016 | Bermudez Rodriguez | G05B 19/042 700/284 |

FOREIGN PATENT DOCUMENTS

| CN | 101699315 B | 4/2012 |
|---|---|---|
| EP | 2562610 | 2/2013 |

OTHER PUBLICATIONS

The Energy Services Provider Interface (OpenESPI) website/screenshot, downloaded Oct. 14, 2014, 1 page.

* cited by examiner

*Primary Examiner* — John H Le
(74) *Attorney, Agent, or Firm* — Pillsbury Winthrop Shaw Pittman LLP

(57) ABSTRACT

Described are apparatus and methods that automatically generate recommendations to growers. Using various different sets of data relative to a predetermined tract of agricultural land, typically including both imagery as well as electrical usage, they are processed together to make informed decisions regarding the state of the land, particularly with respect to water usage.

4 Claims, 9 Drawing Sheets

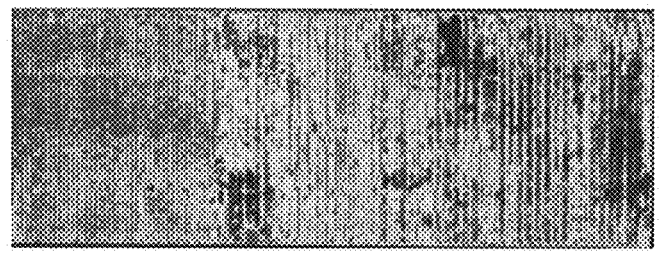
FIG. 10-a
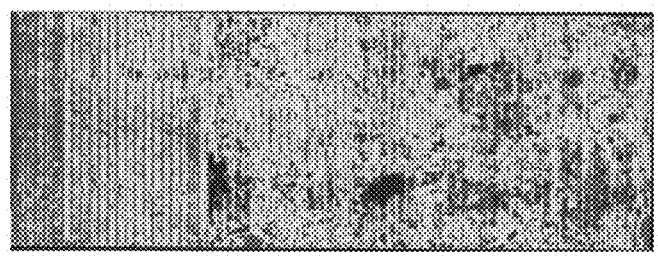
FIG. 10-b
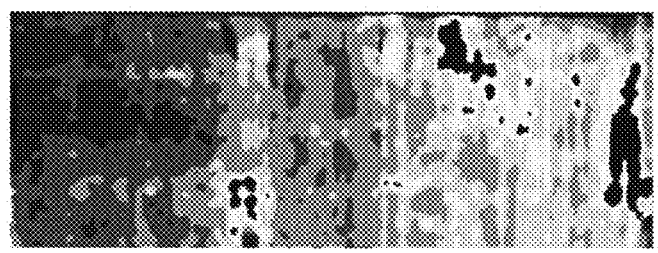
FIG. 11-a
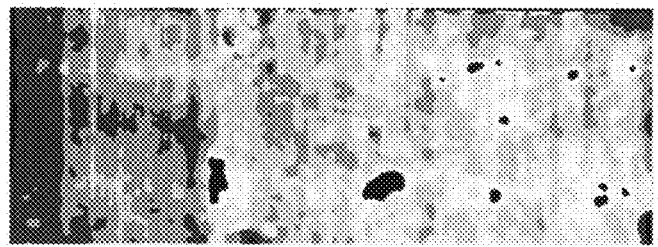
FIG. 11-b May 27, 2014

July 31, 2014

September 22, 2014

AUTOMATED DISTRIBUTION UNIFORMITY MEASUREMENTS AND FARMING PRESCRIPTIONS USING AERIAL IMAGERY AND PUMP ENERGY DATA

BACKGROUND

Climate change and continuous demographic growth is putting an unprecedented burden on growers to meet food demand while reducing water consumption. The industry has the difficult challenge of feeding 9 billion people by 2050 with less water. The situation is already critical in California, which is experiencing an exceptional drought, even while providing more than 50% of US grown fruits, nuts and vegetables. For specialty crops including almonds, California grows more than 90% of the supply.

Growers now have access to a range of irrigation techniques and monitoring sensors to respond to conserve water and increase yield. Drip irrigation is very popular for specialty crops such as almonds and grapes in California. Center pivots are widely deployed in areas of the Mid West to increase yield of annual crops such as corn and wheat, which relied mostly on rain before. The most common irrigation method still remains surface irrigation. More than 70% of farmed lands in the world use flood or furrow irrigation. Their irrigation efficiency is low, typically 70-80% compared to 85-95% for drip irrigation.

Poor irrigation efficiency comes from lack of uniformity in the distribution of water over the field, and also from variability in soil water holding capacity. By investing in data acquisition such as soil samples and soil sensors, and by hiring crop advisors and irrigation specialists to interpret those, growers can adopt more effective farming practices. Data acquisition and analysis, however, remain very labor intensive.

Irrigation uniformity is commonly measured by a standard distribution uniformity (DU) test. An array of cups measures the amount of water at different locations on a field, and the recorded data are manually recorded. An example of DU test is shown in FIG. 1. A DU test is a very good indicator of the efficiency of the irrigation infrastructure. DU is defined as the average of the lowest quartile on the field divided by the average across the field. An example is provided in FIG. 2.

$$\text{Distribution Uniformity} = \frac{\text{water applied to driest 25\%}}{\text{average amount of water applied}}$$

DU tests are labor intensive and cost thousands of dollars. As a result, most farms can't afford it or will only measure part of a field that they know have a problem. It is not uncommon for two thirds of the revenue to come from one third of the farmed land.

Soil variability is also an important factor. Soils vary in their composition of sand, clay and silt. As a result, they have different water holding capacity. The various types of soils are summarized in the textural triangle provided by the National Conservation Resource Services (NRCS) at the US Department of Agriculture (FIG. 3). NRCS actually generated soil maps several decades ago and makes them available for free on its web soil survey portal. An example of USDA soil map is in FIG. 4. However, the maps are often outdated due to erosion, tillage, etc. Most farms don't rely on them to make decisions. Moreover, the maps were not generated using GPS technology and can be off by 100 feet.

One common technique to map the type of soil in a field is an electrical conductivity test. Sand, silt and clay have different conductivity properties as depicted in FIG. 5. Machines can be rented to generate a precise map. An example of machine pulled by a car is given in FIG. 6. A crop advisor will interpret it to provide a map and recommendations.

SUMMARY

Described are apparatus and methods that automatically generate recommendations to growers. Using various different sets of data relative to a predetermined tract of agricultural land, typically including both imagery as well as electrical usage, they are processed together to make informed decisions regarding the state of the land, particularly with respect to water usage.

One embodiment produces an irrigation uniformity map for the predetermined tract of agricultural land and provides an estimated DU score automatically, without manual labor at the site, by leveraging pump energy data that can be used to track irrigation events and measure applied water, in combination with aerial images that track the physiological state of the predetermined tract of agricultural land.

BRIEF DESCRIPTION OF THE DRAWINGS

These and other aspects and features of the present invention will become apparent to those of ordinary skill in the art upon review of the following description of specific embodiments of the invention in conjunction with the accompanying figures, wherein:

FIGS. 10-a and 10-b illustrates during and after irrigation pictures taken from the land illustrated in FIG. 4.

FIGS. 11-a and 11-b illustrates during and after irrigation pictures taken from the land illustrated in FIG. 4 that have been processed into greyscale.

DETAILED DESCRIPTION OF THE PREFERRED EMBODIMENTS

Described are apparatus and methods that automatically generate recommendations to growers. Using various different sets of data relative to a predetermined tract of agricultural land, typically including both imagery as well as electrical usage, they are processed together to make informed decisions regarding the state of the land, particularly with respect to water usage.

Figure 7:
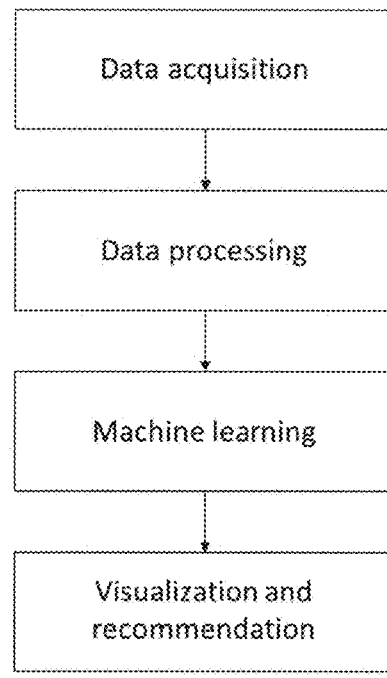
FIG. 7 illustrates an overview of the method that provides that automatically generate recommendations to growers.

As shown in FIG. 7, the method includes various generalized steps, noted as data acquisition, data processing, machine learning, and visualization and recommendation, each of which will be explained and discussed in more detail herein. It is noted at the outset, however, that the method is performed using a computer system that has a processor, memory, keyboard, mouse, display and communication connectivity such as the internet, as are known. The computer system also has loaded onto it application software that performs the various different operations as described herein, based upon software code written to perform the functions as described herein, along with the further descriptions provided herein. The computer system can also be implemented with parts being in the cloud and thus distributed, as well as being capable of shared collaborations, usage and viewings, as is conventional.

Figure 8:
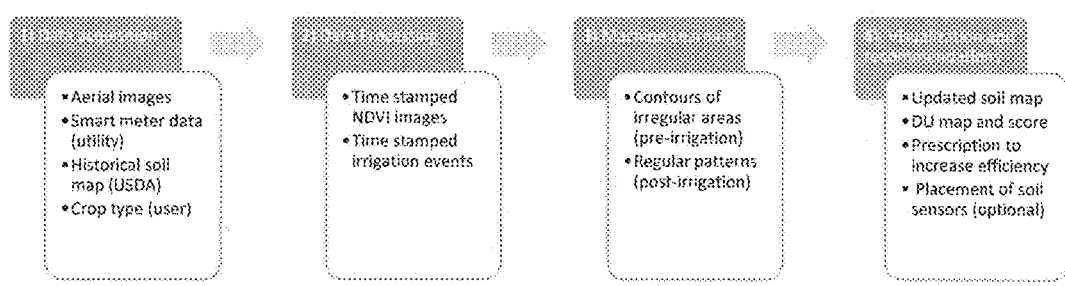
FIG. 8 illustrates a specific embodiment of the system providing automated distribution uniformity measurements using aerial imagery and pump energy data.

One specific embodiment produce irrigation uniformity maps without involving manual labor on-site, and that can estimate the DU score automatically, as is shown in FIG. 8. As shown, pump energy data is input that can be used to track irrigation events and measure applied water, as taught in the patent application entitled Methods To Detect Anomalies And To Measure Water Usage In Pumping Plants Using Energy Consumption Data filed as U.S. patent Ser. No. 14/506,567 filed Oct. 3, 2014, which claims the benefit of U.S. Provisional Patent Application Ser. No. 61/888,459 filed Oct. 8, 2013 and is related to U.S. Utility patent application Ser. No. 14/506,484 filed Oct. 3, 2014, both of which are incorporated by reference herein. Aerial images are also input that track the physiological state of the plant, as a base. Optionally, further included can be inputs of updated soil maps, crop type, and other information. Soil maps can be obtained from a variety of sources, including historical USDA records.

While images from planes and satellites have been commonly used to assist in predicting vegetation vigor, standing alone such images do not typically provide sufficient accuracy to assist in determining how to improve conditions of the land on which the picture was taken. Normalized Differential Vegetation Index (NDVI) and other indices leverage the difference in reflectance at different wavelengths during day time to measure the health of a plant. Water stress, nutrient content and other attributes can be tracked to some extent using aerial images.

While historical pictures can be purchased from various sources, the grower or the advisor may not know the state to which the image corresponds. For instance, the image could have been taken after an irrigation event when all plants show vigor, or before an irrigation event when plants are stressed in areas where the soil does not hold enough water.

Pump energy data and NDVI images can synchronized with other useful information (e.g., weather) to provide the necessary contextual information to interpret images automatically. Referencing FIG. 8, from these inputs, the image and energy data is processed, then a machine learning model, described further herein, is leveraged to operate on the data and obtain useful predictions and estimates from it. Machine learning algorithms can classify various sections and recognize useful patterns, as discussed herein. Based on that, the visualization and recommendations occur, specifically in the form of a DU map and score, along with a prescription to increase efficiency.

Figure 9:
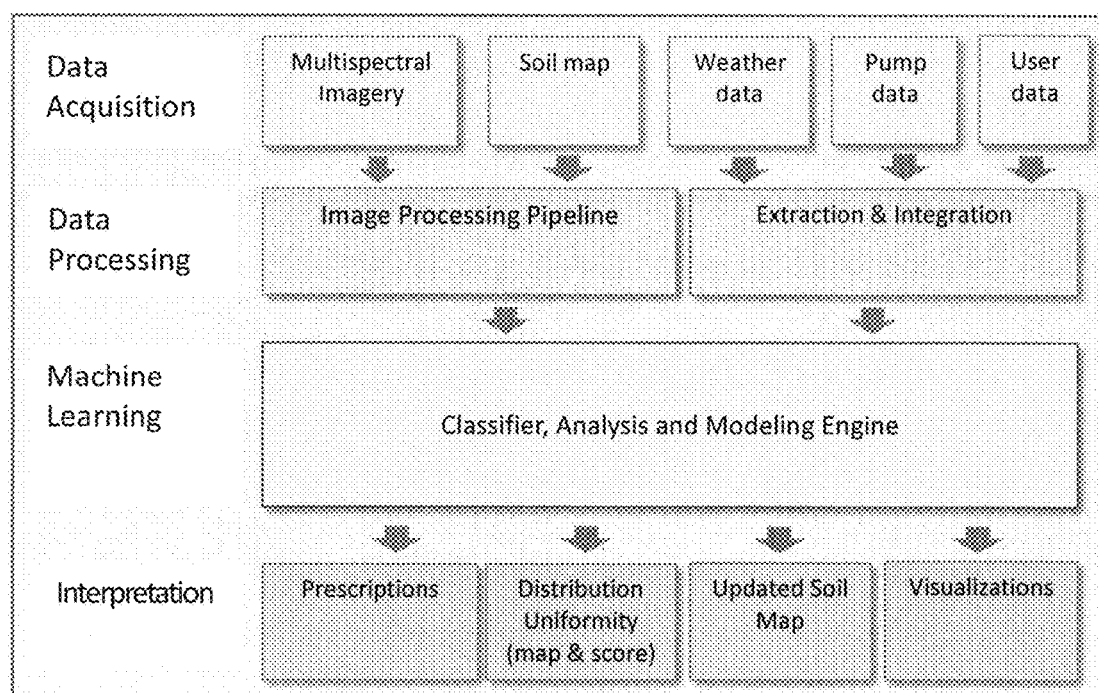
FIG. 9 illustrates a detailed block diagram of the system illustrated by the method overview shown in FIG. 7.

FIG. 9 provides a more detailed break-down of the preferred embodiment. Various different Data Acquisition inputs into the computer system being shown, including multispectral imagery, soil maps, weather data, pump data, as well as user data that can tie together the various different other data inputs.

The Data Processing, using the computer system described above, preferably includes both an image processing pipeline and an extraction and integration module, which can be software or hardware based, but are used to operate on the different data sets described herein, and place them in a format in which they can be used by Machine Learning block as described further herein. Such image processing, extraction and integration are conventional and as such are not described with any further particularity herein.

The Machine Learning module, which functions as a classifier, as well as analysis and modeling engine, similarly uses the computer system described above. Conventional machine learning techniques are preferably implemented, such as a support vector machine SVM, or a cascade of classifiers. Training data is put into the form of feature vectors, and there known manners for classifying the data. Of significance are the relationships used and thus programmed into the software used by the Machine Learning module, which are described further herein.

In a particular implementation, for example, is shown by determining the adjustment for soil Holding Capacity (HC) in a non-uniformly irrigated field/orchard. A portion of the FIG. 4 soil map indicates that the orchard primarily consists of two types of soil, "Ra" on the left and "CsaB" on the right. The soil data in the WSS report reveals that Ra—Ramona (table 1) has a significantly different structure than CsaB—Cometa Sandy Loam (table 2)—provided below. At the intermediate depth, CsaB has a much higher concentration of clay (42.5%) than Ra (11.5%), creating a higher available water capacity (AWC).

A simple method that can be used is a two Input Regression model:

1. Soil Moisture. Expect a correlation between amount of irrigation and plant vigor (more water yields healthier plant). Condition the data: Chose all the pixels in the NDVI image from one of the soil types. Use the soil type that makes up the largest region of the image.

2. Soil AWC. Expect a correlation between soil AWC and plant vigor (high AWC yields healthier plant, since more water goes to plant versus evaporation & runoff). Condition the data: The input data has AWC values for various soil depths. Manually choose the most relevant soil depth, based on the plant type, age, average size, etc.

Figure 1:
FIG. 1 illustrates a field on which a conventional DU test is being performed.
Figure 2:
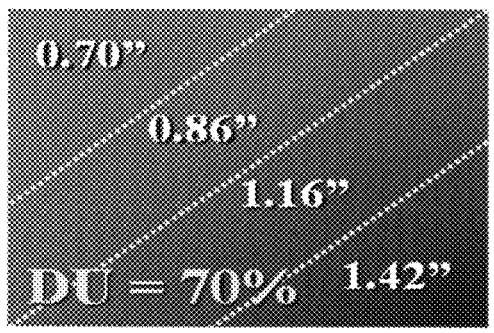
FIG. 2 illustrates graphical results of a conventional DU test.

Perform a linear least squares fit. Plot soil moisture (1) on X axis. Plot soil HC (2) on Y axis. Plot NDVI score (plant vigor) on Z axis. Perform a least squares fit, and plot the result as a 3D surface, as in FIG. 2.10 from Hastie "Elements of Statistical Learning", Chapter 2, page 31. Use the fitted surface function to adjust the plant vigor values in the various soil HC zones.

More sophisticated (more accurate) models also can be implemented. In a higher dimensionality model, mathematically, this increases the amount of computation, but for moderate dimensionality, not significantly, although it does make it hard to visualize the fitted surface function, since it's difficult to visualize high dimensional surfaces.

In 1) the data was conditioned by using the data from one soil region. This discards a lot of data. The model could be extended to have a higher number of dimensions. Each soil type would be an additional dimension.

In 2) the relevant soil depth from the HC data was manually selected. Each soil depth could be an added dimension. Standard statistical methods would be used to determine the most relevant depths, based on correlation analysis, or cross-validation techniques.

Non-Linear Models can also be used. The fitted surface described above was created using a linear regression model, that minimized the mean square error between the data points and the surface. It isn't obvious that 1) or 2) are necessarily linear relationships. In case they are nonlinear, modeling techniques are available that allow this assumption to be relaxed.

The model can also be improved by including additional data. Notable examples include:

1. Soil moisture data at various depths and times, as provided by one or more soil moisture sensors.
2. Additional soil type data. Soil samples, taken from core samples at various locations, sent to a soil analysis lab to determine AWC, and soil composition mixes.

EXAMPLE

Figure 4:
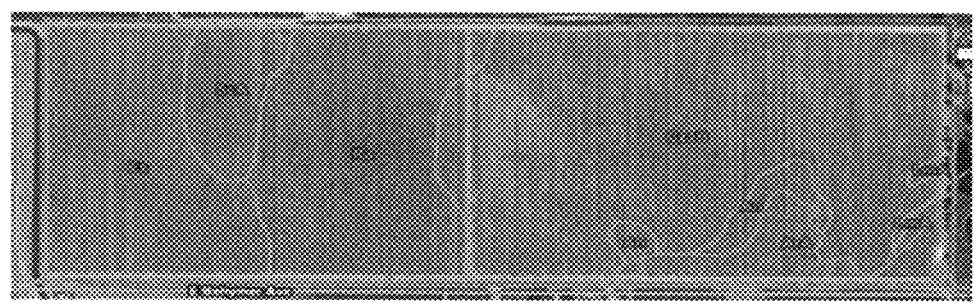
FIG. 4 illustrates a field on which results using the embodiments described herein were determined.
Figure 5:
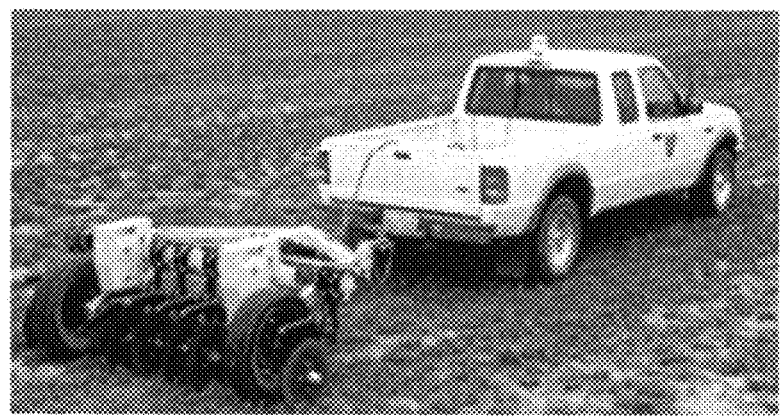
FIG. 5 illustrates a conventional soil electroconductivity test.
Figure 6:
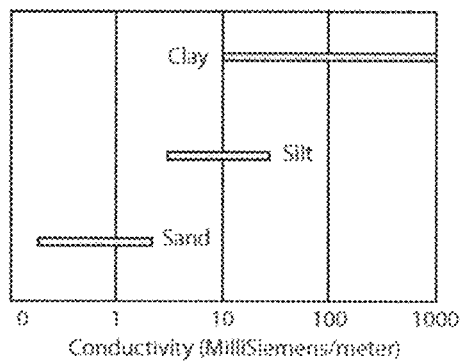
FIG. 6 illustrates a conductivity properties of soil, as used in the embodiments herein.

FIG. 4 illustrates a tract of land from an orchard in California. Historical energy data for the pump on the field was obtained (via the Green Button standard), as were historical aerial images and soil maps from NRCS. Each of these were used as inputs into the Data Acquisition module as shown in FIG. 9.

One aspect of the machine learning model was analyzing the series of images of a field against the energy data, and identifying the ones that corresponded to stress events (insufficient water being applied) or irrigation events (water was recently applied). To do this, the above-described machine learning module was used and the data from these inputs organized in a manner consistent with that described above with reference to Data Processing.

FIG. 10-a shows a NDVI image taken during an irrigation event. FIG. 10-b shows a NDVI image taken after an irrigation event. The images were processed into grayscale at a lower resolution to identify the trends more easily, as shown in FIGS. 11-a, and FIG. 11-b.

The area consistently stressed on the left side is due to a different type of soil with a lower water holding capacity.

The contour of the area was compared to the USDA map of the same field (FIG. 4), which confirmed the result. By removing the constant variability, we were able to estimate the distribution uniformity (FIG. 12), and compute the DU score by comparing the vigor of the vegetation across the field after the irrigation event. Vigor is directly related to irrigation through the physiological process of transpiration.

The DU score is low for a drip irrigation system. One of the causes for poor uniformity is the recurrence of leaks in the irrigation system. Another cause was the cycling of the pump due to a falling water table. Water did not reach the end of the secondary lines, and areas closer to the primarily lines received more water.

Figure 13:
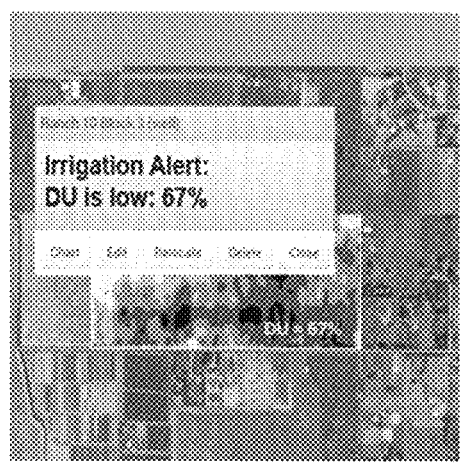
FIG. 13 illustrates an example of an alert provided to a user.
Figure 14:
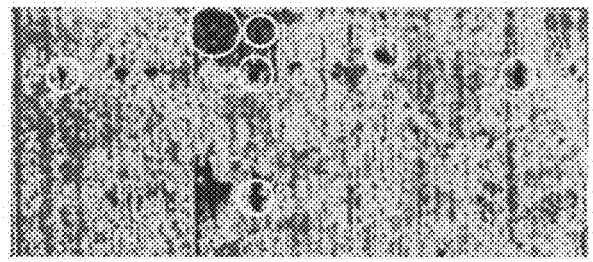
FIG. 14 illustrates (in the circles) the leaks that were located with respect to the land illustrated in FIG. 4.

The uniformity map and the DU score can be represented on a map to make it easier for a grower to visualize the problems. An example of representation is depicted in the GUI shown in FIG. 13. Recommendations such as locations of leaks can be sent via text messages or by email. A list of leaks with GPS coordinates were generated, and compared successfully to ground truth on the field. FIG. 14 illustrates (in the circles) the leaks that were located with respect to the land illustrated in FIG. 4.

Figure 15:
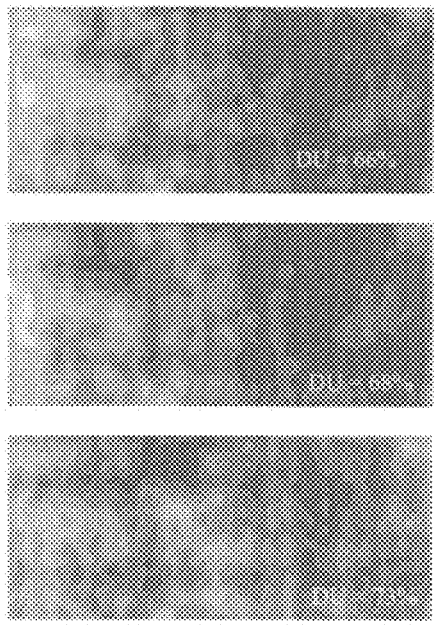
FIG. 15 (a-c) illustrates various distribution uniformity for the land illustrated in FIG. 4 at different dates.
Figure 16:
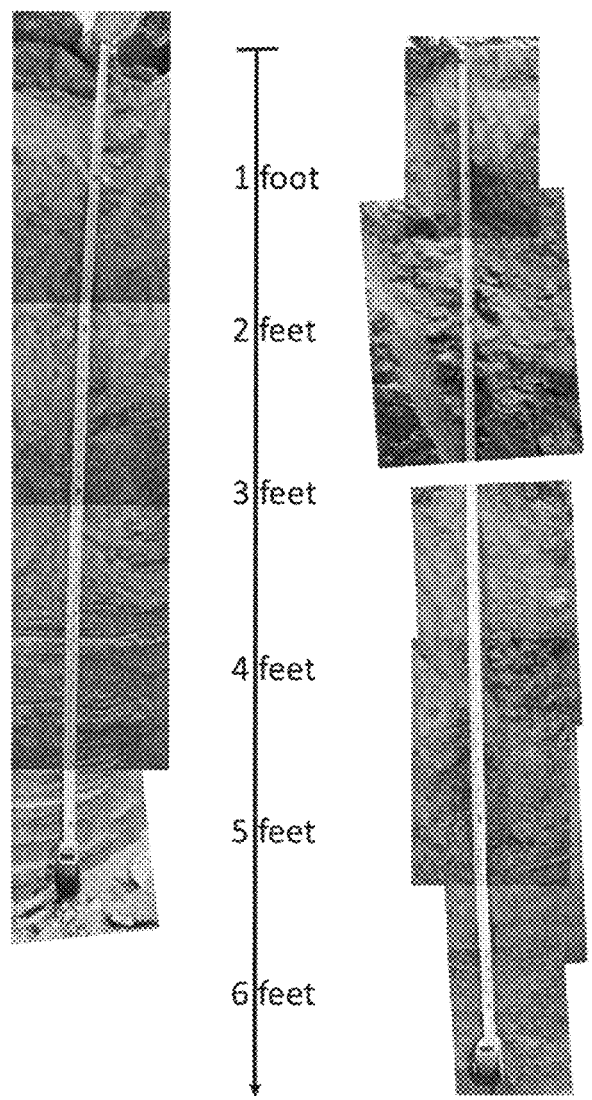
FIG. 16 (a-b) illustrates two different soil profiles for two different parts of the land illustrated in FIG. 4.

The grower fixed the pump cycling problem, and more images were acquired against irrigation events over a period of three months (FIG. 15). The DU score improved over that period from 67% to 74%. The DU score was not calibrated but the relative values were very useful to identify the problem, resolve it and verify, the impact. In addition, it was not believed that there was soil variability in the FIG. 4 field under 100 acres; contrary to this inferred results shown above. The soil was checked with a backhoe pit, and it was found that the dryer soil did not have any layer of clay (FIG. 16-a) while the rest of the field did (FIG. 16-b). This highlights hat detection of such differences can be used to then alter how to proceed in the future, such as in this instance recommending to change the irrigation schedule of the field with the different type of soil.

The DU estimation method, based upon the above, can be further implemented in a preferred embodiment using the below specifics:

acquire energy data that identifies start and end of irrigation events
  acquire NDVI images
  sort NDVI images against irrigation events
  identify an NDVI image taken long after a previous irrigation event, and before another irrigation event for baseline. When a field has been irrigated, all the plants have access to water. When the field is not irrigated, the water available to the plants depends on the water available in the soil, which is directly related to its soil structure and water holding capacity
  identify an NDVI image taken just after an irrigation event
  Mapping of pixels for irrigation relationship of the NDVI image taken just after an irrigation event. Red NDVI pixels as low irrigation, green NDVI pixels as high irrigation. A linear mapping is used in one implementation, and the range can be determined as needed, such as 0.0 to 1.0 being a convenient scale.
  Adjust irrigation relationship mapping for soil uniformity: Decrease the irrigation estimate in spatial regions where the soil has high water holding capacity. Increase the irrigation estimate where the soil has low water holding capacity. Soil maps have multiple depths. For instance 6, 12, 18 and 24 inches. The type of crop determines which soil depth to use for the holding capacity estimate.
  The amount of adjustment that can be made will depend upon the situation. Without any training data, a user parameter can be used, input based upon overall averages. With training data, a learned parameter is preferably used. This training data can take several forms, such as one or more of:
    a history of the user parameter settings
    integration of other sources of uniformity data, such as thermal or NDVI images after a rainfall (uniform irrigation event) moisture or temperature sensor data
  And, since the spatial boundary between soil types is unlikely to be sharply defined, the adjustment is made using a spatial smoothing filter such as a gaussian. i.e. smoothed_soil_map=gaussianBlur(theta, usda_soil_map); where theta is a smoothing parameter (the amount of blur). Initially the smoothing parameter is a user parameter. With training data theta becomes a learned parameter. Training would be one or more of (a) a history of the user parameter settings and (b)

actual soil samples from the farm/orchard or soil samples taken from farms/orchards in the vicinity.

Figure 12:
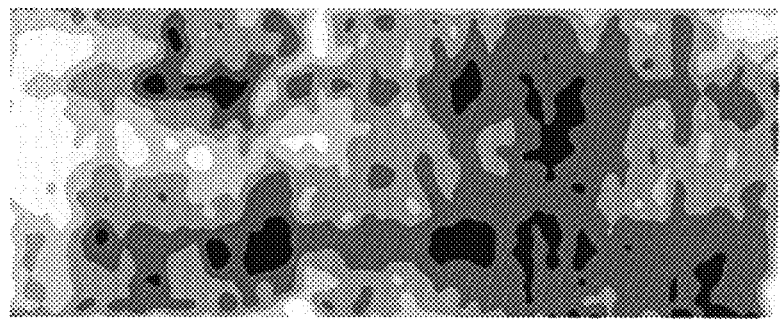
FIG. 12 illustrates a distribution uniformity for the land illustrated in FIG. 4. [MAKE SURE THIS IS CORRECT].

Remap the results for DU visualization: white is minimum water, and dark green is maximum water (FIG. 12). As most image formats (ie jpeg, bmp) are required to be 3 or 4 channels (red, green, blue) or (red, green, blue, transparency), each with 8 bits of data (0-255). In this implementation, it was desired to show the display as white to dark green (the color scheme is optional). To scale from white (rgb: (255,255,255)) to dark green (rgb:(0,80,0)) multiply DU (0.0:1.0) red=DU*255, green=DU*80, blue=DU*255. It is noted that this remap requires knowledge of when the pictures were taken, which knowledge in one embodiment is derived from the energy data from the pumps that allows knowledge what NDVI map was before an irrigation event or after.

(Optionally) Convert visualization image to gray scale (black is zero, white is 255). The histogram and cumulative histogram (discussed below) are linear mappings, so the scaling is arbitrary. The histogram can also be generated using the DU image (0.0:1.0); In this example, it was scaled 0:255 by multiplying each DU image pixel value by 255, as per a grayscale image mapping.

Create a histogram and cumulative histogram. These are based on probability functions and cumulative distribution functions in statistics. An image histogram is a standard statistical/image processing procedure, (ie as defined by matlab imhist( )) where you define a number of bins, (ie 255), Then each bin contains a count of the number of pixels in the image that are equal to that value. Likewise, a cumulative histogram is a standard procedure (ie as defined by matlab cumsum( )) where, given a histogram, each bin accumulates the sum of itself, plus the cumulative sum of each preceding (lower valued) bin. A simple histogram is shown below:

| raw values | histogram | | cumulative histogram | | |
|---|---|---|---|---|---|
| value | value | count | value | cum.count | normalized |
| 1 | 1 | 2 | 1 | 2 | 0.25 |
| 1 | 2 | 3 | 2 | 5 | 0.625 |
| 4 | 3 | 1 | 3 | 6 | 0.75 |
| 2 | 4 | 2 | 4 | 8 | 1 |
| 4 | | | | | |
| 2 | | | | | |
| 3 | | | | | |
| 2 | | | | | |

In this simple example, there are 8 raw data values. In an actual DU image, with a spatial resolution of say 640×480, there would be 307,200 values (307200=640*480). In this example, pixel values are in the range (1:4). In the DU image, pixel values would be mapped to the range (0:255). The histogram in this example has bins with values of 1, 2, 3 and 4 (corresponding to the range 1:4). In the DU example, bin values would be 0, 1, 2, 3, . . . 254, 255. So there would be 256 bins, with values 0, 1, 2, . . . 254, 255. In the example the normalize cumulative histogram for the driest (largest) 25% would be the pixels with the values of 4 (normalized cum. values above 0.75). There are two of them, and their average value is 4. The global average is 2.375. DU would be 2.375/4, or 59%.

From the cumulative histogram, find the average value of the 25% of the pixels that have the least amount of water (in the example: 167). Since the driest areas have high (white) values in the DU map, the driest 25 percent is found by normalizing the cumulative distribution function (dividing by the value in the largest bin), and finding the two bins that span the 25% value (one bin will have a value lower than 0.25 and one will be higher than 0.25). The 25% value would be found by linear interpolation using these two bins.

Find the global average (in the example: 124). The global average is a simple average of all DU pixel values. The average value of the low 25% is a simple average of any pixels with a value lower than the 25% threshold.

Compute DU=(255−167)/(255−124)=88/133=0.662

Round up value in percentage: 67%

Compare to threshold (e.g., 80%)

Report that DU is low in text alert

It is also apparent that NDVI imagery from planes along with infra-red cameras and energy data from smart meter deployed by power utilities is combined, and that one set of data (local or imagery) is not enough to do distribution uniformity measurement and provide prescriptions.

Further Embodiments

The spectral reflection of plants, and the subsequent NDVI response images can be impacted by any factor that impacts photosynthesis. Factors that affect the uniformity of NDVI images of crops include soil uniformity, nutrient uniformity, and the presence of weeds, disease, fungus and insect infestation.

Further, site topology is part of irrigation uniformity measurement. For example, a slight slope on a field will affect the uniformity of surface irrigation.

Factors that can Affect Alter the Measurement of DU from Images:

a) Soil uniformity: Areas of soil exhibiting high water holding capacity will be similar to areas receiving high amounts of water. In both cases, the net effect is that plants in those areas receive more water. The effects of non-uniform soil can be mitigated by including the USDA soil mapping data or other soil mapping data in the analysis. Soil is a three dimensional volume, especially for deep rooted plants and trees, so the soil map needs to be accurate at a range of depths. The USDA data can be augmented by water holding capacity measurements taken randomly, or at sites prescribed by the software.

Figure 3:
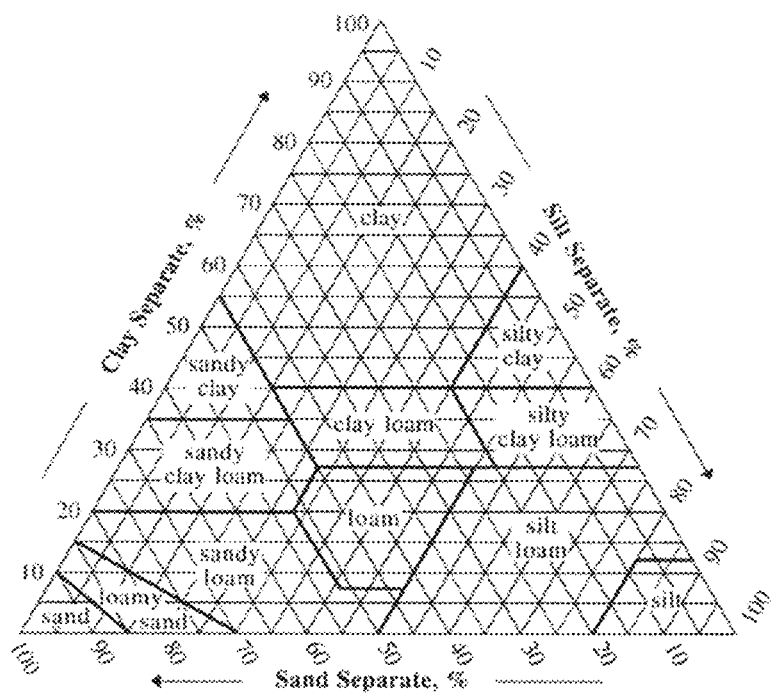
FIG. 3 illustrates the NRCS soil triangle, as used in the embodiments herein.

The chart illustrated in FIG. 3 can also be correlated to the specific land being investigated. In one implementation, UCSDA-NRCS has historical database of soil that can be used as well. With reference to the FIG. 4 field, a soil data report reveals that one portion of the field (CsaB—Cometa Sandy Loam (table 1) has a significantly different structure than the other portion of the field (Ra—Ramona (table 2) At the intermediate depth, CsaB has a much higher concentration of clay (42.5%) than Ra (11.5%), and therefore higher available water capacity (AWC).

| Depth Inches | Sand % | Silt % | Clay % | AWC In/In | Depth Inches | Sand % | Silt % | Clay % | AWC In/In |
|---|---|---|---|---|---|---|---|---|---|
| 12 | 66 | 22.5 | 11.5 | 0.10 | 17 | 66 | 19 | 15 | 0.10 |
| 24 | 66 | 22.5 | 11.5 | 0.10 | 26 | 28 | 30 | 42.5 | 0.20 |
| 38 | 67 | 18 | 25 | 0.17 | 60 | 63 | 22 | 15 | 0.09 |

Thus, known soil types can be used to assist in better estimating the distribution uniformity of the irrigation system. While this embodiment does not analyze the soil structure, the soil elements don't change. Over time, however, with irrigation and tillage, areas and detailed structure change. That variation is taken out by removing areas of different water holding capacity with what is described, in one embodiment.

b) Different nutrient concentrations will exhibit characteristics similar to non-uniform irrigation.

When nutrients are applied during irrigation the same prescription will fix both sources of non-uniformity.

When nutrient measurements are available, for example from nitrogen measuring devices, the DU estimate can be adjusted accordingly. The irrigation estimate will be decreased in areas of high nutrient concentrations, and increased in areas of low nutrient concentration.

c) Weed, disease, insect and fungus infections generally exhibit spatial patterns caused by the propagation of the infestation. With sufficient training data these patterns would be detected by human observers and image analysis. Over time, given sufficiently large data sets the system should be capable of learning the root cause of these patterns.

Data that can Improve the Measurement of DU:

a) Visible imagery: Portions of a crop with relatively small or sparsely spaced plants will have a lower average NDVI response than larger or more closely spaced plants. Image processing methods are used to separate leaf cover from background (soil) regions. Plant detection algorithms are used to segment the actual crop from weeds or grass. NDVI imagery can be affected by events such as mowing the grass or tilling the soil. Visible images can be used to compensate for these types of events.

b) Thermal imagery: Infrared cameras that record images using the long wavelength thermal spectrum are very useful for augmenting irrigation uniformity results. Due to evaporative cooling, wetter areas are cooler and dryer areas are warmer.

c) Historical imagery: Over the span of months or years, the effects of nutrient variability, weeds and diseases will be small, compared to the long term factors such as soil uniformity and topography. Uniformity estimates will be improved by performing temporal averaging of imagery.

d) Natural Events: Rainfall is a natural event that in many cases can be considered a "perfect" irrigation event, with respect to irrigation uniformity. By considering visible, near infra-red and thermal imagery before and after a significant rainfall, the soil uniformity can be analyzed in detail.

Machine Learning Algorithm that can Improve Performance:

a) Regression algorithms such as gradient descent, linear least squares and regression trees to create mathematical models of the data, and to remove values of systematic error in measurement.

b) Classifiers such as Support vector machines and Random Forests to separate the impact of different factors such as nutrients and water, and to accommodate models with large numbers of dimensions.

c) Neural networks can be used to identify non-linear relationships allowing the use of larger amount of historical data.

Given historical data on water, nutrients, soil structure and other key factors, it is possible to include as further variables used in the machine learning module information such as:

a) Nutrient content that can be the base of a prescription to apply fertilizers in particular N, P and K.

b) Updated soil maps to optimize the placement of sensors on a field. Common sensors include Soil moisture probes that measure soil tension, volumetric water content or electric conductance, Sap tension devices, weather stations to measure temperature, precipitation, relative humidity and other environmental factors, as well as cameras.

c) The identification of anomalies such as water stress on the field. Alerts can be sent with geo-locations so the ranch manager or irrigator can fix the problem on the field.

Specific User Implementations.

The output GUI shown in (FIG. 13) shows a DU report can be ordered online and alert received on a phone message. Different types of output GUIs may be produced, such as a map on web-based application. For each different type of output GUI, the different types of information that can be displayed include geo-locations, irrigation value in color code, and overall DU estimation.

With this DU implementation, a new DU test is recommended every year, and the evaluation of the DU can be tracked over time, which cannot be presently done.

Further automated processes may be triggered in response to the generated output information, such as management of farming staff to resolve problems, optimization of nutrient application, and specific placement of equipment such as sensors described above and below.

Also, with the above, users from different geographic locations are able to use inventive technology to collaborate, analyze and/or resolve problems. The fact that the measurements can be analyzed on the cloud multiple times allow farming staff and consultants to collaborate online. The results can be visualized by multiple people at different places. The FIG. 13 GUI integrates pump energy information and aerial imagery at a vineyard to facilitate troubleshooting and optimization of harvest.

As a working/walk-through example of the types of things which remote users may accomplish which may be difficult (or impossible) to implement using conventional/manual techniques, the fact that critical metrics can be computed automatically from digital data (images, time-series of weather conditions, time-series of pump condition, etc.) make the results much accessible, as well as allows what used to be analyzed at most once a year can be done once a month or once a week. With geo-references, this is the base for precision agriculture that conserve resources and optimize crop yields.

Although the present inventions are described with respect to certain preferred embodiments, modifications thereto will be apparent to those skilled in the art.

The invention claimed is:

1. A method of irrigating a determined area of land that is serviced by providing water thereto using an irrigation system that includes an electrical pump, the method comprising the steps of:

inputting, into a memory of a computer system that includes a processor, at least one photograph of the determined area of land;

inputting, into the memory of a computer system that includes the processor, local energy data corresponding to energy usage of the electrical pump;

determining, based upon software automatically executed by the processor, in combination with the photograph and the local energy data, a distribution uniformity for the determined area of land, the step of determining including automatically adjusting value of the distribution uniformity factoring in soil uniformity within the determined area of land; and irrigating the determined area of land using the electrical pump in accordance with the determined distribution uniformity and data from the electrical pump.

2. The method according to claim 1 further including the steps of:
comparing value of the determined distribution uniformity against a threshold distribution uniformity; and
transmitting an alert if the determined distribution uniformity is lower than the threshold distribution uniformity.

3. The method according to claim 2 further including the steps of:
further providing, based upon software automatically executed by the processor, in combination with the photograph and the local energy data, any additional geo-referenced location within the determined area of land for which there exists at least one cause of degradation of distribution uniformity due to (a) a clog or leakage in any component of the irrigation system; (b) a soil erosion issue; (c) an infestation of insects and/or fungus; (d) non-optimal sensor placements; and (e) malfunction of any component of the irrigation system.

4. A method of providing a farming prescription for a determined area of land that is serviced by providing water thereto using an irrigation system that includes an electrical pump, the method comprising the steps of:
inputting, into a memory of a computer system that includes a processor, at least one photograph of the determined area of land;
inputting, into the memory of a computer system that includes the processor, local energy data corresponding to energy usage of the electrical pump;
prescribing, based upon software automatically executed by the processor, in combination with the photograph and the local energy data, any additional information about the determined area of land, wherein the irrigation system is equipped to apply chemicals to the determined area of land, and, sensors are placed in the determined area of land; and
using the additional information to perform at least one of (a) updating amount of nutrients including amount of any N, P and K, where N is Nitrogen, P is Phosphorus and K is Potassium, to a geo-referenced location within the determined area of land, (b) updating sensor placements within the determined area of land, and (c) applying pesticide to counter infestation of insects and/or fungus within the determined area of land.

* * * * *